Oct. 9, 1923. 1,470,436
J. W. FURMAN
VERMIN KILLING DEVICE FOR PLANTS
Filed April 18, 1922
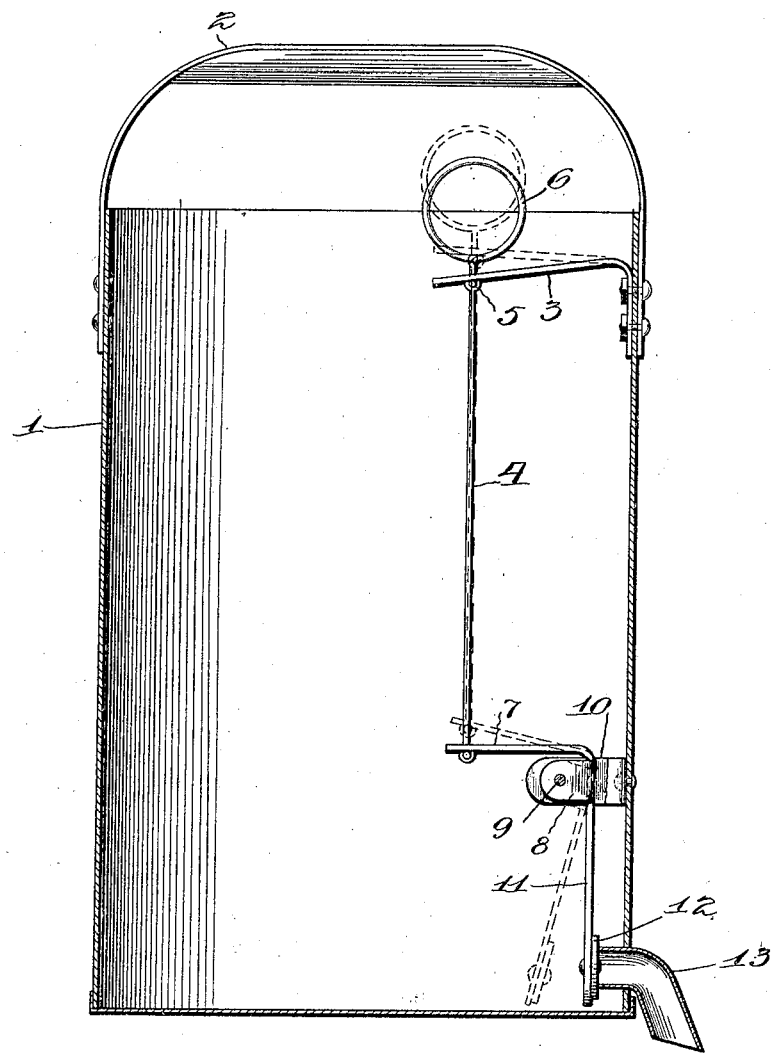

Patented Oct. 9, 1923.

1,470,436

UNITED STATES PATENT OFFICE.

JOHN W. FURMAN, OF POINT TOWNSHIP, NORTHUMBERLAND COUNTY, PENNSYLVANIA.

VERMIN-KILLING DEVICE FOR PLANTS.

Application filed April 18, 1922. Serial No. 554,618.

*To all whom it may concern:*

Be it known that I, JOHN W. FURMAN, a citizen of the United States, residing in Point Township, in the county of Northumberland and State of Pennsylvania, have invented certain new and useful Improvements in Vermin-Killing Devices for Plants, of which the following is a specification.

This invention relates to improvements in devices for applying chemicals to plants for the purpose of killing insects, maggots, or other vermin that lodge upon cabbage, radish and similar vegetable or friut plants.

The device is operated by the user as he walks along the rows of plants and discharges a small quantity of the chemical upon each of them.

The various features of the invention will be more fully described in connection with the accompanying drawing, in which:—

The figure is an enlarged vertical sectional view of the device.

Referring to the drawing, 1 indicates a cylindrical tank or reservoir in which a suitable quantity of the destroyer may be contained. 2 indicates a handle secured to each side of the container at the top by any suitable means. 3 is a spring fastened to the the side of the container near the top by means of bolts or otherwise. An operating rod 4 passes through the spring 3 near the free end having a retaining pin 5 abutting against the bottom of the spring. The said spring acts as a guide for the rod 4. A ring 6 is attached to the upper end of the rod 4 being adapted to be grasped by the operator. The bottom of the rod 4 is secured to the end of the horizontal member 7 of an inverted L shaped arm which is fastened to a U shaped retainer 8, the latter being pivoted at 9 and operates within the U shaped holder 10, secured to the side of the container 1. Fastened to the lower end of the vertical member 11 of the operating arm is a valve 12 adapted to close the mouth of the discharge spout 13.

The operation of the device is as follows:—The handle of the container is gripped by the user who raises the operating rod by means of the ring at the top of the same thereby permitting the chemical to pass through the spout of the container. The amount of chemical emitted is regulated by the length of time the valve is held open.

What I claim as new and desire to secure by Letters Patent is:—

In a vermin exterminator, a container having an outlet at the side near the bottom, an arm hinged to one side of the container and carrying a valve positioned over said outlet, a flat spring having a bent portion scured to the side of the container above said outlet and an operating rod connected to said arm and to the free end of said spring, the distance between the said points of connection being such that the valve will normally be held closed.

In testimony whereof I affix my signature, in presence of two witnesses.

JOHN W. FURMAN.

Witnesses:
JOHN WEISER BASSLER,
C. W. CLEMENT.